US012806806B2

(12) United States Patent
Miyazaki

(10) Patent No.: US 12,806,806 B2
(45) Date of Patent: Nov. 24, 2026

(54) ROBOT, ROBOT CONTROL METHOD, DRIVE DEVICE, DRIVE DEVICE CONTROL METHOD, ARTICLE MANUFACTURING METHOD, AND RECORDING MEDIUM

(71) Applicant: CANON KABUSHIKI KAISHA, Tokyo (JP)

(72) Inventor: Yoshiyuki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 18/824,018

(22) Filed: Sep. 4, 2024

(65) Prior Publication Data

US 2025/0100167 A1 Mar. 27, 2025

(30) Foreign Application Priority Data

Sep. 22, 2023 (JP) ................................ 2023-159241

(51) Int. Cl.
*B25J 19/00* (2006.01)

(52) U.S. Cl.
CPC .................................... *B25J 19/00* (2013.01)

(58) Field of Classification Search
CPC ........... G05B 2219/39001; F16H 21/02; F16H 21/46; G08B 5/36; B25J 9/106; B25J 19/00
USPC ........................................................ 340/691.1
See application file for complete search history.

(56) References Cited

U.S. PATENT DOCUMENTS

| | | | | |
|---|---|---|---|---|
| 9,375,841 | B1 * | 6/2016 | Kemper | B25J 17/00 |
| 10,427,294 | B2 * | 10/2019 | Hongo | B25J 9/0051 |
| 10,821,613 | B2 * | 11/2020 | Yoshimura | B25J 17/0241 |
| 11,045,961 | B2 * | 6/2021 | Goto | B25J 9/161 |
| 2004/0200304 | A1 * | 10/2004 | Matsumoto | B25J 19/0029 74/490.02 |
| 2018/0319022 | A1 * | 11/2018 | Yoshimura | B25J 9/0009 |
| 2019/0099903 | A1 * | 4/2019 | Goto | B25J 9/161 |
| 2020/0070341 | A1 * | 3/2020 | Nakayama | B25J 9/1612 |

FOREIGN PATENT DOCUMENTS

| | | | |
|---|---|---|---|
| JP | 2016-043438 | A | 4/2016 |
| JP | 2018-187722 | A | 11/2018 |
| JP | 2019-063938 | A | 4/2019 |
| JP | 2020-023019 | A | 2/2020 |
| JP | 2023-114742 | A | 8/2023 |
| JP | 7661257 | B2 * | 4/2025 |

* cited by examiner

*Primary Examiner* — Eric Blount
(74) *Attorney, Agent, or Firm* — Venable LLP

(57) ABSTRACT

A robot includes at least one joint connecting two links. The joint includes a light source mounted on a substrate and a diffusion unit configured to diffuse light from the light source. A space in which a wiring is stored is provided between a virtual plane in the substrate and the diffusion unit.

23 Claims, 12 Drawing Sheets

X1-X1 CROSS SECTION

Y1-Y1 CROSS SECTION

ROBOT, ROBOT CONTROL METHOD, DRIVE DEVICE, DRIVE DEVICE CONTROL METHOD, ARTICLE MANUFACTURING METHOD, AND RECORDING MEDIUM

BACKGROUND OF THE INVENTION

Field of the Invention

The present invention relates to a robot including a light emitting unit and the like.

Description of the Related Art

For example, it is expected that robots each having a movable part such as an arm is instructed to perform various kinds of work at various locations, including manufacturing lines, and inevitably, opportunities for people to approach robots are increasing. For example, when teaching an operation to a robot by so-called direct teaching, a method may be used in which a worker directly moves a movable part such as an arm in the same manner as during the operation while holding it to register a movement trajectory in a control unit of the robot. In addition, there is an increasing demand for cooperative work in which a person and a robot perform work in cooperation at a short distance.

As described above, when a robot and a person perform some work in proximity, it is necessary for the worker to easily recognize the state of the robot from the viewpoint of the safety of the worker.

JP 2016-43438 A describes a robot in which a movable arm is supported by a columnar base, and a light emitting unit to be visually recognized by a worker is disposed on the columnar base.

JP 2019-63938 A describes a robot in which a first space and a second space are formed between a first casing and a second casing of the robot, with a light emitting element disposed in the first space and a driving unit disposed in the second space.

SUMMARY OF THE INVENTION

According to a first aspect of the present invention, a robot includes at least one joint connecting two links. The joint includes a light source mounted on a substrate and a diffusion unit configured to diffuse light from the light source. A space in which a wiring is stored is provided between a virtual plane in the substrate and the diffusion unit.

According to a second aspect of the present invention, a drive device includes a driving portion for driving a robot including at least one joint connecting two links. The joint includes a light source mounted on a substrate and a diffusion unit configured to diffuse light from the light source. A space in which a wiring for driving the robot is stored is provided between the substrate and the diffusion unit.

Further features of the present invention will become apparent from the following description of exemplary embodiments with reference to the attached drawings.

DESCRIPTION OF THE EMBODIMENTS

Figure 1A:
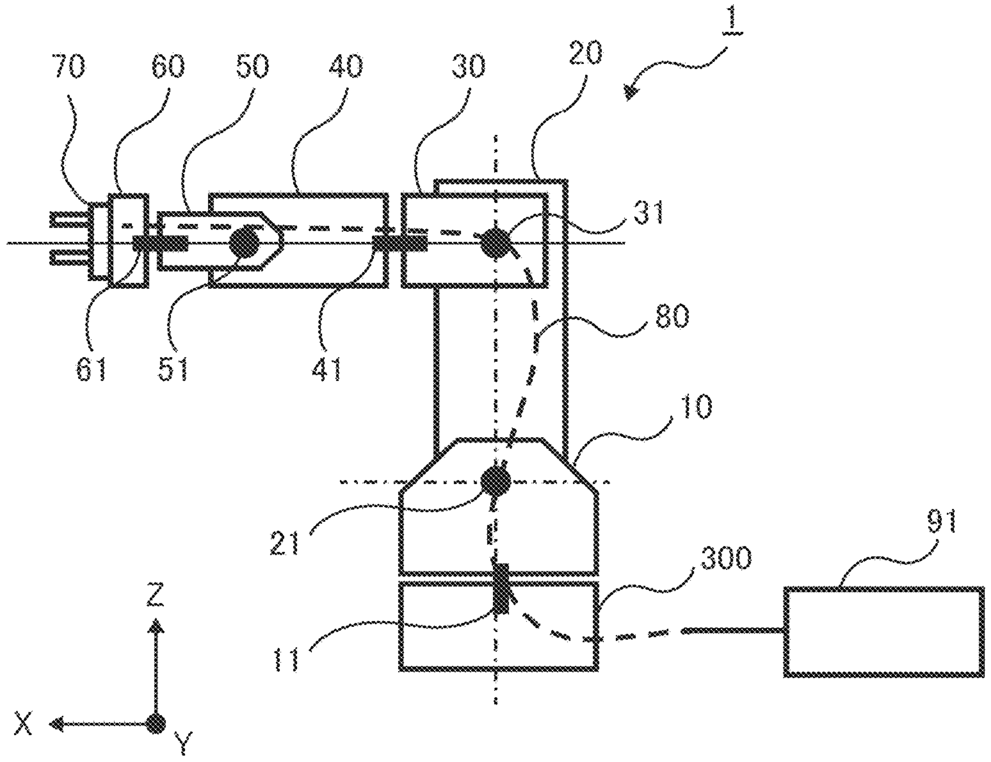
FIG. 1A is a schematic side view for explaining an overall configuration of an example of a robot according to an embodiment.

A conventional robot provided with a light emitting unit does not necessarily have a structure for making it easy for a worker to visually recognize light emission, causing a concern that the safety of the worker cannot be sufficiently secured when teaching work, cooperative work, or the like is performed in proximity.

In the robot described in JP 2016-43438 A, the light emitting unit is disposed in a band shape at a lower portion of the robot, specifically, around a base-side fixing unit on a cylinder where the robot is installed. For example, when the robot is instructed to perform automatic assembly work or direct teaching work is performed for the automatic assembly work, if a jig tool, a component supply machine, or the like necessary for the work is arranged around a portion where the robot is installed, the light emitting unit is blocked by the jig tool, the component supply machine, or the like, and the visibility of the light emitting unit deteriorates. Therefore, it is difficult for a worker or the like to recognize the light emission of the light emitting unit and grasp the operation state of the robot.

In the robot described in JP 2019-63938 A, the light emitting element is disposed in the space between the casings, but there is a concern that the light emitting element is hidden and cannot be visually recognized in a certain posture or a certain operation state (orientation) of the robot arm at the time of teaching work or work in cooperation with a person.

As described above, the conventional light emitting unit provided to indicate the state of the robot may be difficult to visually recognize from surrounding people in a certain situation. Therefore, a robot capable of enabling surrounding people to visually recognize light emission for indicating the state of the robot in an easy way has been expected.

A robot and the like according to embodiments of the present invention will be described with reference to the drawings. The embodiments to be described below are exemplary, and for example, detailed configurations can be appropriately modified for implementation by those skilled in the art without departing from the gist of the present invention.

Meanwhile, it should be noted that, in the drawings referred to in the following description of embodiments, elements denoted by the same reference numerals have the same functions unless otherwise specified. In the drawings, in a case where a plurality of identical elements is arranged, the reference numerals and explanations thereof may be omitted.

In addition, since the drawings may be schematically represented for convenience of illustration and description, shapes, sizes, arrangements, and the like of elements illustrated in the drawings may not be exactly consistent with actual objects.

Embodiment

First, an overall configuration of a robot and a control system will be described, and then a configuration of a joint of a robot arm and a display provided on the joint will be described.

Overall Configuration of Robot

Figure 1B:
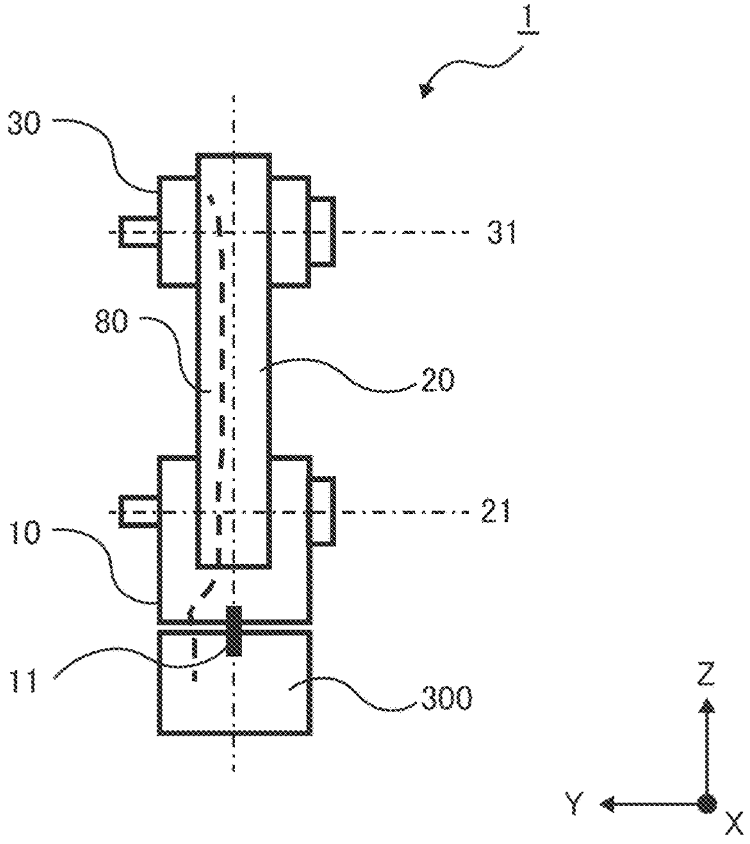
FIG. 1B is a schematic external view of a robot arm in a posture illustrated in FIG. 1A as viewed from the rear.

FIG. 1A is a schematic side view for explaining an overall configuration of an example of a robot according to an embodiment, and FIG. 1B is a schematic external view of a robot arm 1 in a posture illustrated in FIG. 1A as viewed from the rear (along the X direction). In the drawing, coordinate axes of a three-dimensional coordinate system used for controlling the robot arm 1 are illustrated.

As illustrated in FIG. 1A, the robot includes a robot arm 1 and a control device 91 that controls the robot arm 1.

The robot arm 1 is a so-called serial link type robot arm in which a plurality of links are connected in series via a plurality of joints. Although a six-axis control robot arm is illustrated in the drawing, the embodiment of the present invention is not limited to the exemplified robot arm.

The robot arm 1 is fixed to a base via a fixed-side link 300. A link 10 is connected to the fixed-side link 300 via a joint 11 whose rotation axis is parallel to the Z axis, and a link 20 is connected to the link 10 via a joint 21 whose rotation axis is parallel to the Y axis. Similarly, a joint 31 whose rotation axis is parallel to the Y axis, a link 30, a joint 41 whose rotation axis is parallel to the X axis, a link 40, a joint 51 whose rotation axis is parallel to the Y axis, a link 50, a joint 61 whose rotation axis is parallel to the X axis, and a link 60 are connected in series from the base side to the distal end side. Note that, in the above description, the direction of the rotation axis of each joint has been described based on the robot arm being in the illustrated posture (initial posture).

The movable range of each joint is set as follows with respect to the initial posture. For example, the movable range of the joint 11 is about ±180 degrees, the movable range of the joint 21 is about ±80 degrees, the movable range of the joint 31 is about ±70 degrees, the movable range of the joint 41 is about ±180 degrees, the movable range of the joint 51 is about ±120 degrees, and the movable range of the joint 61 is about ±240 degrees.

The joint 11, the joint 41, and the joint 61 are configured in such a manner that each has a rotation axis parallel to or coaxial with central axes (illustrated by an alternated long and short dash line) of two links coupled thereto, and is capable of changing (relative) angles of the two links around their rotation axes.

On the other hand, the joint 21, the joint 31, and the joint 51 are configured in such a manner that each has a rotation axis intersecting central axes (illustrated by an alternated long and short dash line) of two links coupled thereto, and is capable of changing (relative) angles of the two links around their rotation axes. In the following description, a joint whose rotation axis intersects central axes of two links coupled thereto, such as the joint 21, the joint 31, or the joint 51, may be referred to as a bending joint. In addition, when viewed from the proximal end side, a joint that controls the second axis may be referred to as a second joint, a joint that controls the third axis may be referred to as a third joint, and a joint that controls the fifth axis may be referred to as a fifth joint.

An end effector 70 suitable for work performed by the robot is connected to the link 60 at the distal end of the robot arm 1. For example, in a case where a robot performs assembly work or conveyance work in a production line, a hand driven by, for example, electricity or air pressure can be attached to the robot arm 1 as the end effector 70. The end effector 70 is fixedly or detachably attached to the link 60 by a fixing part (not illustrated). The fixing part may be a fixing part such as a screw or a detachable fixing part such as a ratchet. When the detachable end effector 70 is attached, the control device 91 may control the robot arm 1 to attach or replace the end effector placed at a storage position by an operation of the robot itself.

As schematically illustrated by a dotted line, a wiring member 80 including a signal line, a power line, and the like connecting the robot arm 1 and the control device 91 to each other is disposed inside the robot arm 1. In a case where the robot arm 1 includes a joint or an end effector that operates by fluid drive such as air pressure or hydraulic pressure, the wiring member 80 may include a fluid pipe. The wiring member 80 has flexibility and is disposed from a proximal end portion to a distal end portion of the robot arm 1. An electric wire or pipe constituting the wiring member 80 is appropriately branched at various places of the robot arm 1, and is connected to an actuator and a sensor of each joint, an actuator and a sensor of the end effector 70, and the like.

Control System

Figure 2:
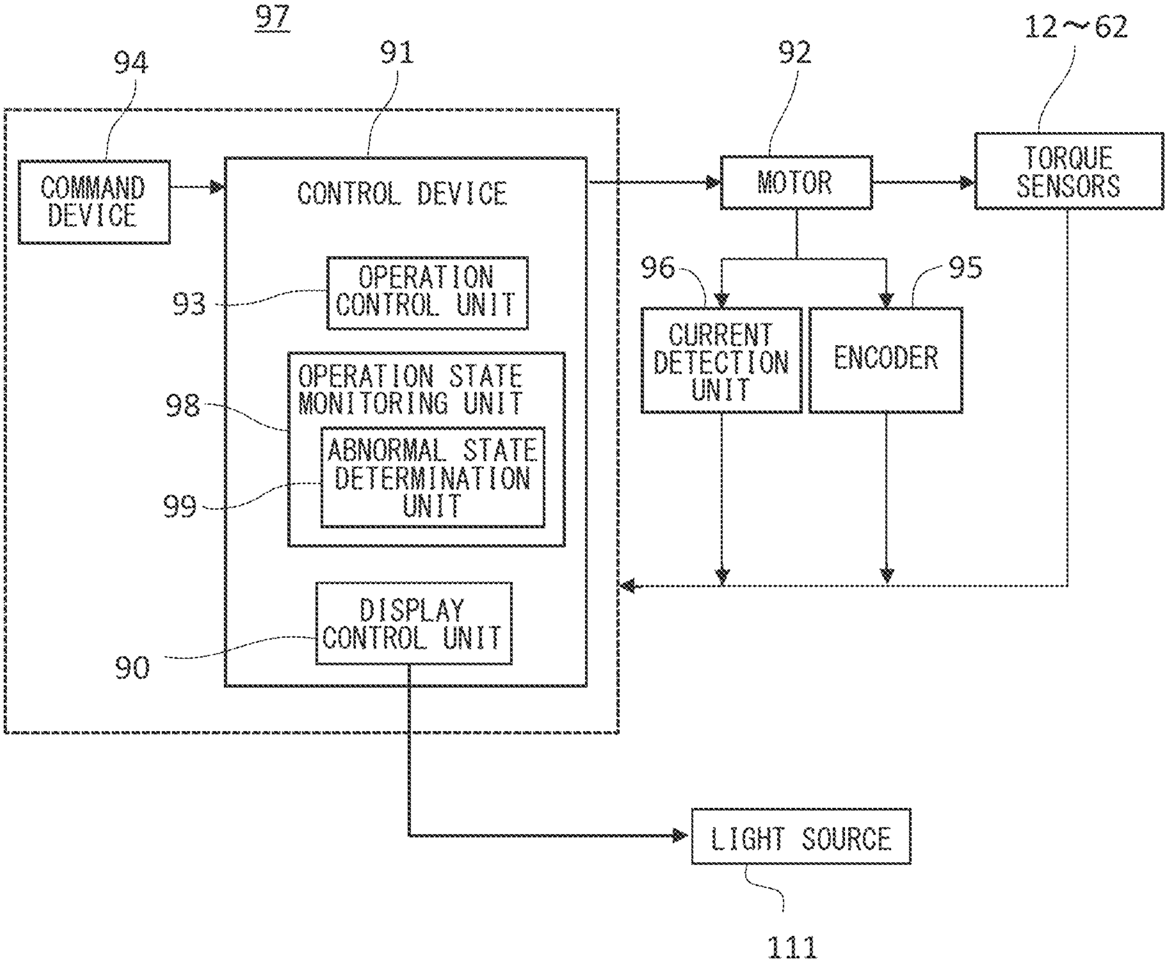
FIG. 2 is a schematic block diagram for explaining a control system.

FIG. 2 is a schematic block diagram for explaining a control system 97, focusing on a control device 91. The control device 91 is a computer that controls an operation of the robot arm 1, and includes an operation control unit 93, an operation state monitoring unit 98, and a display control unit 90 as functional blocks.

The control device 91 is constituted by a computer (not illustrated), and includes a central processing unit (CPU). The control device 91 also includes a read only memory (ROM), a random access memory (RAM), a hard disc drive (HDD), and a recording disc drive as a storage unit. In addition, the control device 91 includes interfaces for communicating with external devices. The CPU, the ROM, the RAM, and the interface are communicably connected to each other by a bus.

Among them, the RAM is used to temporarily store data such as teaching points and control commands input by operating a teaching pendant. The ROM stores a basic program such as a BIOS for causing the CPU to execute various kinds of arithmetic processing. The CPU executes various kinds of arithmetic processing based on a control program recorded (stored) in the HDD. The HDD can store various kinds of data and the like which are calculation processing results of the CPU. The recording disk drive can read various kinds of data, control programs, and the like recorded in a recording disk. Furthermore, a monitor on which various images are displayed and an external storage device such as a rewritable nonvolatile memory or an external HDD are connected to the interfaces.

Each of the functional blocks for the operation control unit 93, the operation state monitoring unit 98, and the display control unit 90 can be configured by the CPU reading and executing a control program stored in, for example, a storage device or a non-transitory recording medium. Alternatively, some or all of the functional blocks may be configured by hardware such as an ASIC included in the control device 91.

A command device 94 is connected to the control device 91 to constitute the control system 97 of the robot including the robot arm 1. The command device 94 can be, for example, a teaching device such as a teaching pendant. The command device 94 includes, for example, an operation unit including an operation key, and a worker can command a posture (position and angle) of the joint of the robot arm 1 or a position of a reference point arranged at a predetermined position (e.g., a distal end) of the robot arm 1 to the control device 91 via the operation unit.

The command device 94 may be another computer device (PC or server) capable of editing a robot program. The command device 94 can be connected to the control device 91 via a wired or wireless communication unit, and has a user interface function for operating the robot and displaying a status.

The operation control unit 93 of the control device 91 controls each unit of the robot arm 1 by executing a robot control program read from the storage unit. Detection values are input to the control device 91 from an encoder 95 that detects a rotation of the motor 92 that drives each joint, a current detection unit 96 that detects a drive current value of the motor 92, and torque sensors 12 to 62 included in the joints 11 to 61. Using these detection values, the operation control unit 93 controls an operation of the robot arm by a control method according to work, such as a position control or a torque control.

The operation state monitoring unit 98 included in the control device 91 monitors an operation state of the robot arm 1. For example, it is monitored whether a force related to a joint is within the range assumed in the work, whether an excessive load exceeding the allowable range is applied to a joint, and the like. In addition, for example, a temperature sensor (not illustrated) can be used to monitor a temperature of the exterior of the robot arm 1 and monitor whether there is any problem if a worker approaches or comes into contact with the robot arm 1.

The operation state monitoring unit 98 includes an abnormal state determination unit 99, and the abnormal state determination unit 99 determines whether the operation state of the robot arm is normal based on the detection values input from the respective sensors.

Using the state of the robot arm 1 analyzed by the operation state monitoring unit 98 (including the result of the determination made by the abnormal state determination unit 99), the control device 91 determines whether to continue or stop the work operation to control the operation of the robot arm 1.

The display control unit 90 included in the control device 91 controls a light source 111 of a display unit provided in a joint mechanism to be described below. The operation control unit 93 of the control device 91 determines a display pattern to be displayed by the display unit based on the state of the robot arm 1 analyzed by the operation state monitoring unit 98, and gives a command to the display control unit 90. The display control unit 90 causes the light source 111 of the display unit provided in the joint mechanism to emit light according to the display pattern based on the command. The display pattern may include settings related to a spatial pattern (which one of a plurality of light sources light is to be emitted from), a temporal pattern (whether light is to be emitted in a continuous manner or in a blinking manner), a light emission color, a light emission intensity, and the like.

Joint

A structure and the like of a joint included in a robot according to an embodiment will be described by taking the joint 31 that is a bending joint as an example. Note that the joint 21 and the joint 51 are also bending joints, and the basic configurations thereof are the same as or similar to that of the joint 31.

Figure 3:
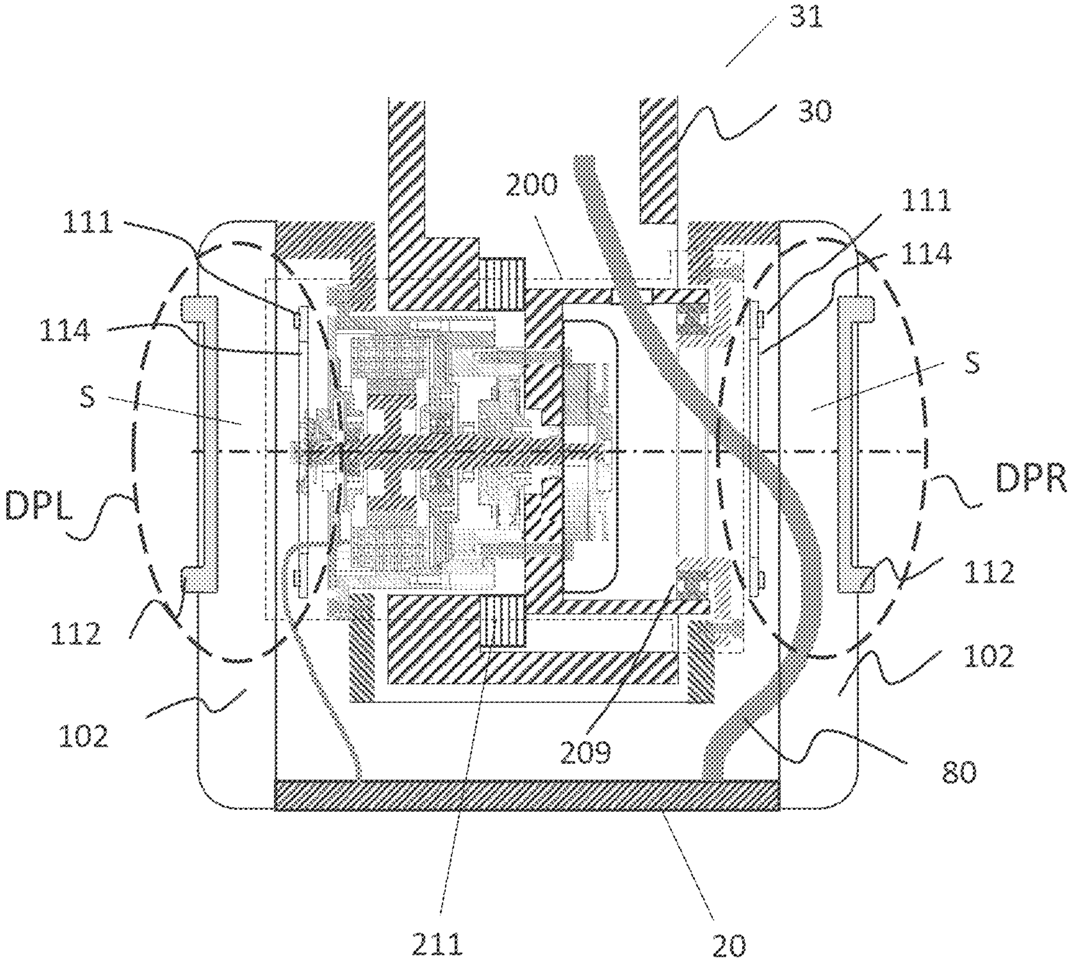
FIG. 3 is a schematic cross-sectional view for explaining a configuration of a joint.
Figure 4:
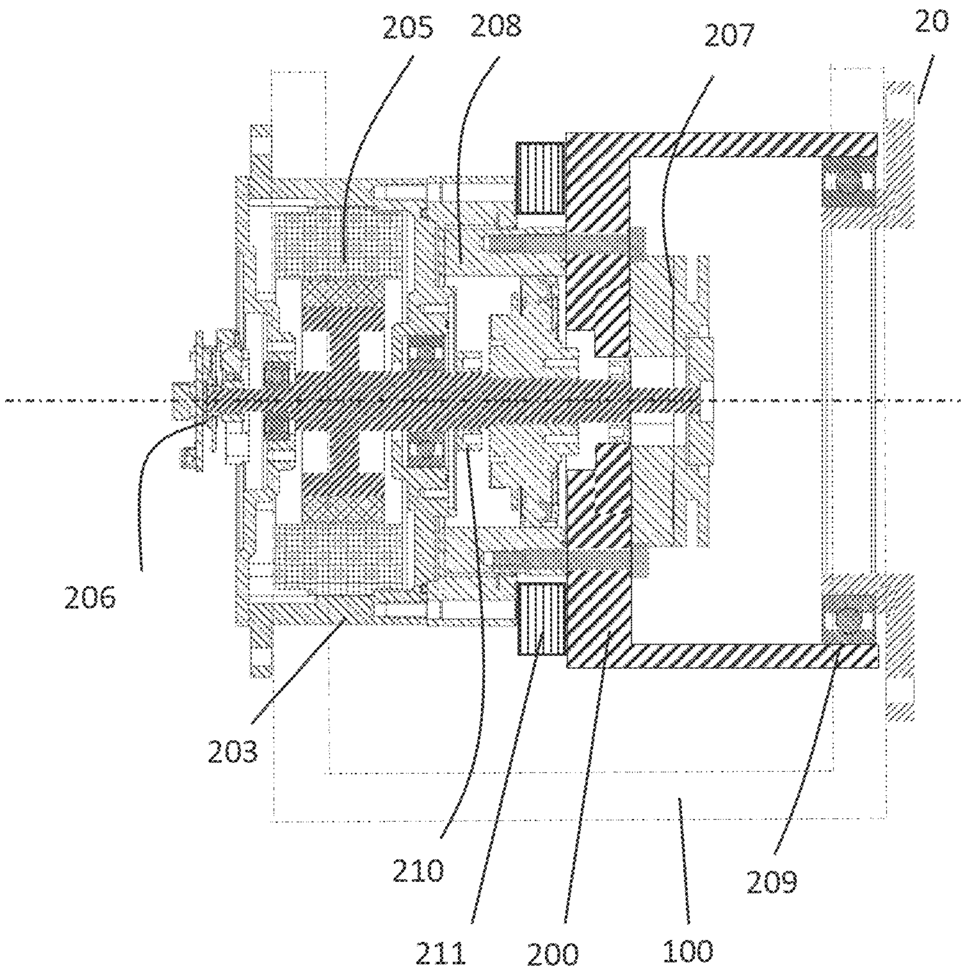
FIG. 4 is a partial cross-sectional view of a partial portion of a joint enlarged to explain a configuration around a support.

FIG. 3 is a schematic cross-sectional view for explaining a configuration of the joint 31, and FIG. 4 is a partial cross-sectional view of a partial portion of the joint 31 enlarged to explain a configuration around a support 200. As illustrated, the joint 31 includes a fixed-side link 20, a movable-side link 30, and a support 200. A frame portion of the fixed-side link 20 has a concave shape, and supports the support 200 via bearings 209. In the internal space of the joint 31, the wiring member 80 including a signal line, a power line, and the like is disposed.

The driving unit of the joint 31 includes a motor 205 that rotates about a rotation axis indicated by an alternated long and short dash line in FIG. 4, an encoder 206 that detects a rotation of the motor 205, a speed reducer 208 for increasing an output torque, a brake 207, and an oil seal 210.

The support 200 is connected to an output side of the driving unit and a torque sensor 211, and transmits an output torque of the driving unit to the torque sensor 211. The output torque transmitted to the torque sensor 211 is transmitted to the movable-side link 30 via the torque sensor 211 to rotate the link 30.

The stator side of the motor 205 is connected to the fixed-side link 20 by a connecting plate 203. The components of the driving unit, which need to be arranged to be concentric to the rotation axis of the motor 205, are integrated by the connecting plate 203 and the support 200.

A display including a light emitting unit is installed on an exterior cover 102 covering a side surface of the joint 31. In FIG. 3, a display DPL surrounded by a dotted line is installed on a left side surface of the joint 31, and a display DPR surrounded by a dotted line is installed on a right side surface of the joint 31. In the robot according to the present embodiment, since the display including the light emitting unit is provided on the side surface (preferably both side surfaces) of the bending joint, a worker can see the display with high visibility regardless of the position and posture of the robot arm. The side surface of the bending joint is suitable for installing the display, because it is positioned to be easily visible regardless of angles of links to which the joint is connected.

Display

Figure 5:
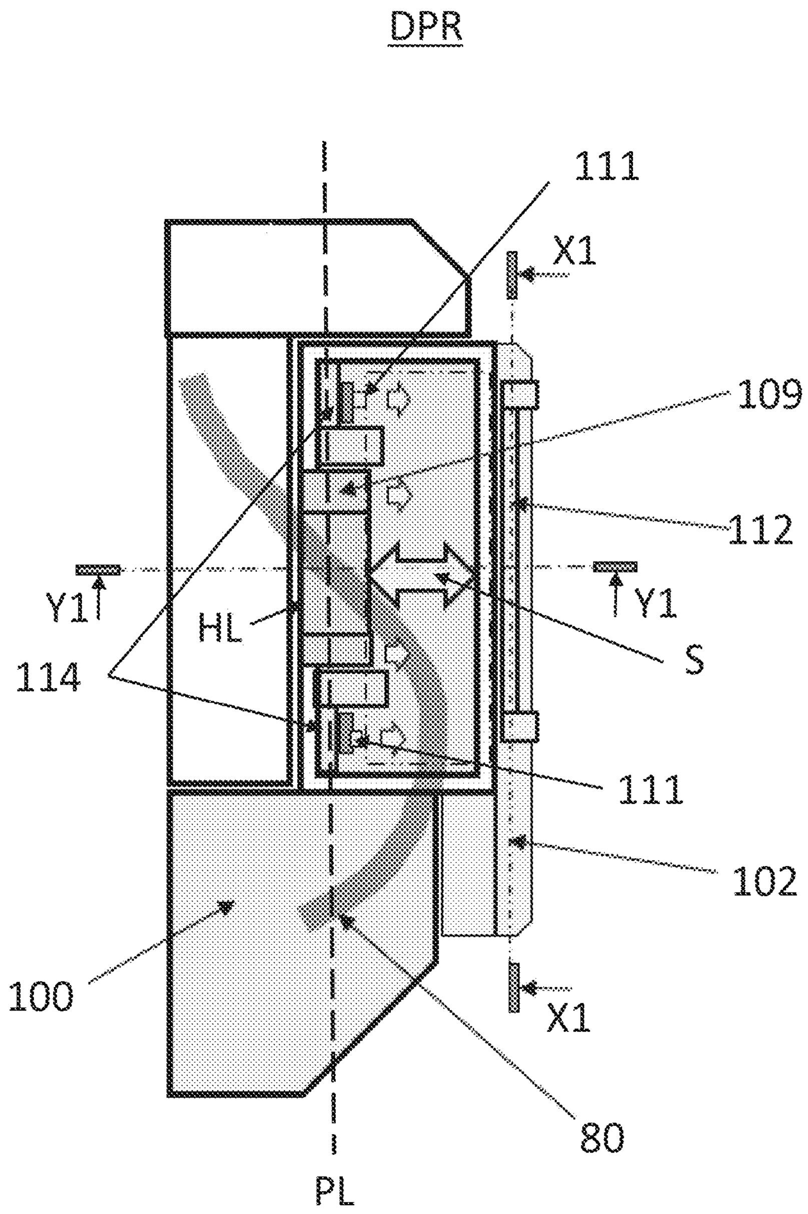
FIG. 5 is a schematic cross-sectional view for explaining a display.
Figure 6A:
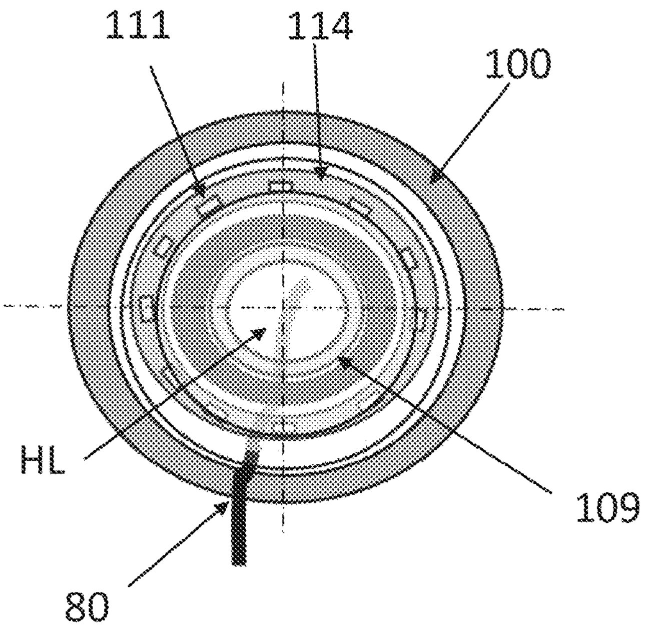
FIG. 6A is a cross-sectional view taken along line X1-X1 illustrated in FIG. 5.
Figure 6B:
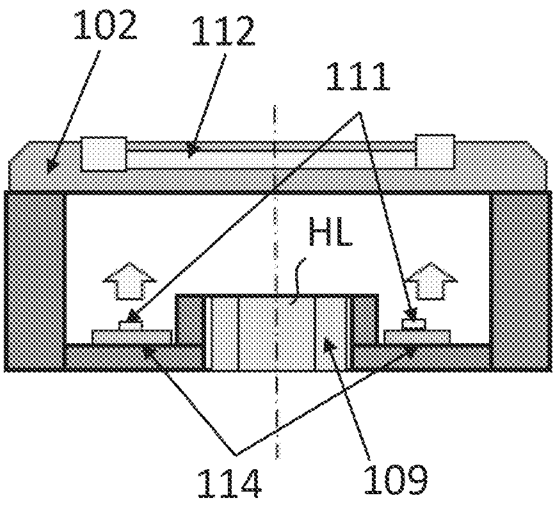
FIG. 6B is a cross-sectional view taken along line Y1-Y1 illustrated in FIG. 5.

FIG. 5 is a schematic cross-sectional view for explaining the display DPR, and is also a partially enlarged view of FIG. 3. FIG. 6A is a cross-sectional view taken along line X1-X1 illustrated in FIG. 5, and FIG. 6B is a cross-sectional view taken along line Y1-Y1 illustrated in FIG. 5.

The display DPR includes a substrate 114, a plurality of light sources 111 mounted on the substrate 114, and a light transmissive diffusion plate 112 serving as a diffusion unit that diffuses light emitted from the light sources 111.

As the substrate 114, for example, a solid substrate made of a glass epoxy resin or a paper phenol resin, or a flexible substrate (sheet-like substrate) made of polyimide or the like can be used. Although a plane PL on which a main surface of the substrate 114 exists is indicated by a dotted line in FIG. 5, the plane PL may be referred to as a virtual plane on which the main surface of the substrate is disposed. The substrate 114 is disposed on a member (e.g., a fixed frame 100) constituting the fixed-side link 20. The substrate 114 is installed in such a manner that the plane PL intersects the rotation axis of the joint and is substantially parallel to the side surface of the joint. Since the substrate 114 is a member having a main surface on which the light sources 111 are mounted, the substrate 114 can also be referred to as a surface member.

The substrate 114 has an opening HL for allowing the wiring member 80 to pass therethrough at a position corresponding to the rotation axis of the joint, and the shape of the substrate 114 in plan view is typically an annular shape surrounding the opening HL. A wiring guide 109 is provided in the vicinity of the edge of the opening HL to prevent the wiring member 80 from interfering with the edge of the opening HL when the joint moves and generating an operation resistance, and to prevent the wiring member 80 from being worn or damaged. The material and the surface of the wiring guide 109 are configured to enable the wiring member 80 to move smoothly when the joint moves. The wiring member 80 extends from the fixed-side link (the link 20 in this example) to the movable-side link (the link 30 in this example) via the opening HL.

The light sources 111 are arranged on the substrate 114 in such a manner as to surround the rotation axis of the joint. The light sources 111 are light emitting elements such as LEDs, and light emission is controlled by the display control unit 90 (FIG. 2). The light sources 111 emit light in a direction toward the light transmissive diffusion plate 112. For example, while the plurality of light emitting elements may be arranged along the circumference around the rotation axis of the joint, the diffusion plate may be an annular (donut-shaped) plate provided at a position facing the light emitting elements, or may be a plate having a circular shape or another shape. The light transmissive diffusion plate 112 is disposed in an opening of the exterior cover 102 attached to the fixed-side link 20.

In the present embodiment, in order to prevent the wiring member 80 from interfering with the substrate 114 and the diffusion plate 112 when the joint moves, a space S is provided between the plane PL where the main surface of the substrate 114 exists and the diffusion plate 112. Strictly speaking, the space S for preventing the wiring member 80 from interfering with not only the substrate 114 itself but also the components mounted on the substrate 114 is secured between the plane PL and the diffusion plate 112.

Figures 7A, 7B, 7C:
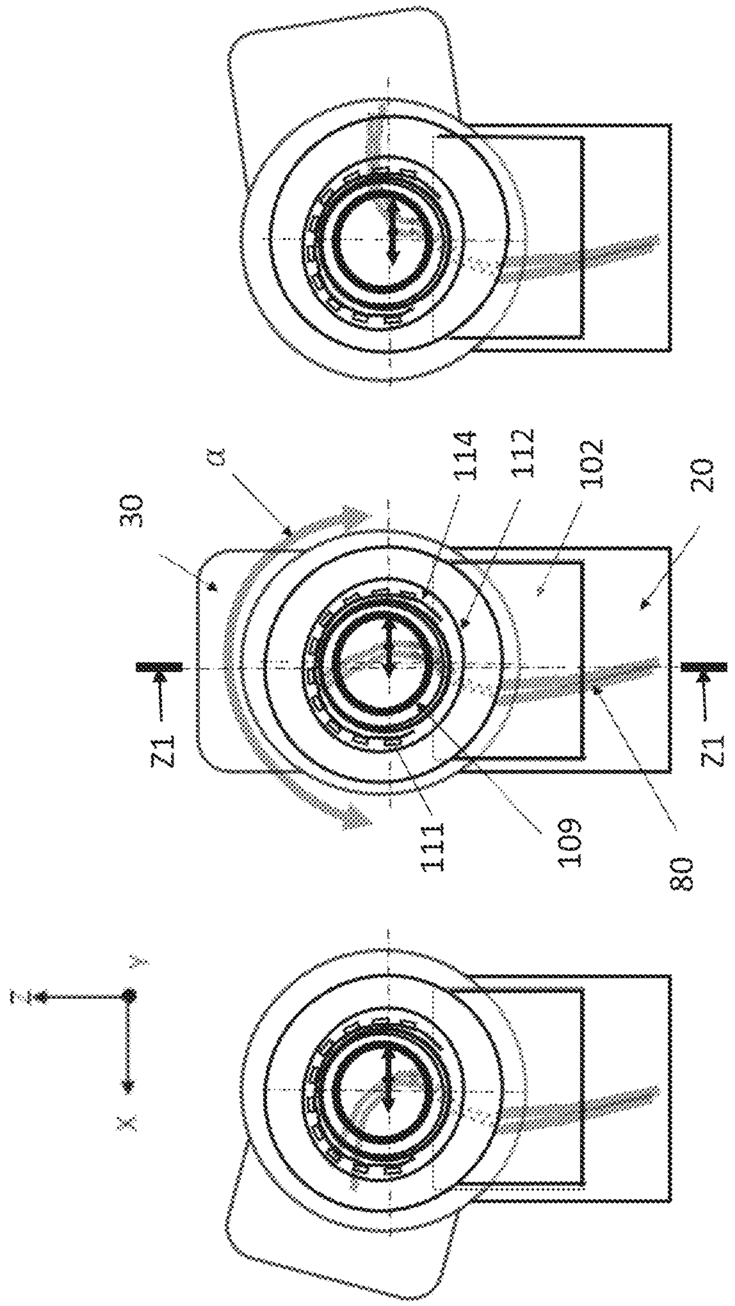
FIG. 7A is a perspective view of a joint when viewed from its side surface in a direction along a rotation axis of the joint in a certain posture.
FIG. 7B is a perspective view of the joint when viewed from its side surface in the direction along the rotation axis of the joint in another posture.
FIG. 7C is a perspective view of the joint when viewed from its side surface in the direction along the rotation axis of the joint in still another posture.
Figure 8A:
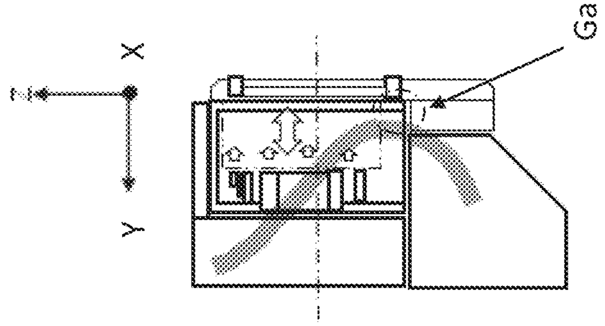
FIG. 8A is a schematic cross-sectional view illustrating a cross section of the joint of FIG. 7A taken in a direction along line Z1-Z1 shown in FIG. 7B.
Figure 8B:
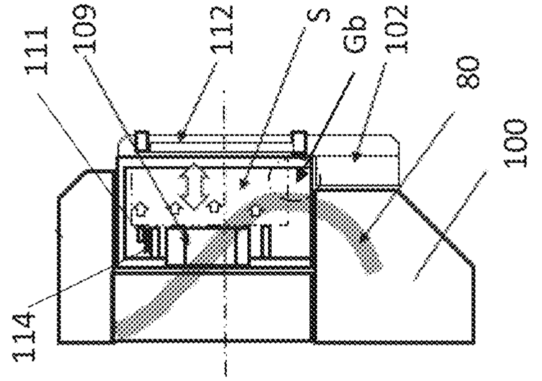
FIG. 8B is a schematic cross-sectional view illustrating a cross section of the joint of FIG. 7B in the direction along line Z1-Z1 shown in FIG. 7B.
Figure 8C:
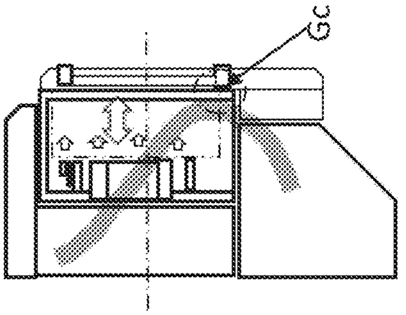
FIG. 8C is a schematic cross-sectional view illustrating a cross section of the joint of FIG. 7C taken in a direction along line Z1-Z1 shown in FIG. 7B.

A movement of the wiring member 80 when the posture is changed by operating the joint will be described in relation to the space S. FIGS. 7A to 7C are perspective views of the joint when viewed from its side surface in a direction along the rotation axis of the joint, and illustrate three cases in which the angle of the movable-side link 30 with respect to the fixed-side link 20 is changed within a movable range α. FIGS. 8A to 8C are schematic cross-sectional views illustrating cross sections obtained by cutting the joint illustrated in FIGS. 7A to 7C in a direction along line Z1-Z1 illustrated in FIG. 7B.

When the joint 31 is driven by a command of the control device 91 and the angle of the link 30 with respect to the link 20 changes, the wiring member 80 swings in the X direction (the left-right direction in the drawing) in an XZ plane as illustrated in FIGS. 7A to 7C. Even though the wiring member 80 swings in the XZ plane, there is no problem because the wiring member can come into contact with the wiring guide 109 only.

In addition, when the angle of the movable-side link 30 with respect to the fixed-side link 20 changes, the wiring member 80 is bent in a different manner when viewed in the YZ plane as illustrated in FIGS. 8A to 8C, and the position of the vertex of the bent portion swings in the Y direction in the space S as illustrated as Ga, Gb, and Gc.

In the present embodiment, the height of the space S in the rotation axis direction (Y direction) is sufficiently secured such that the bent wiring member 80 does not contact the components mounted on the substrate 114, the exterior cover 102, and the inner surface of the diffusion plate 112. In other words, the distance between the substrate 114 and the diffusion plate 112 is set such that the bent portion of the wiring member 80 does not come into contact with the components mounted on substrate 114 and the inner surface of the diffusion plate 112 even when the bent state of the wiring member 80 changes.

Therefore, according to the present embodiment, even though the wiring member is laid via the display, the wear of the wiring member and the generation of the frictional resistance are suppressed when the joint is operated, thereby making it possible to stably operate the robot arm 1 for a long period of time. In addition, the light sources 111 and the electric circuit components mounted on the substrate 114 are suppressed from being damaged due to contact with the wiring member, thereby making it possible to stably operate the display for a long period of time, while enabling surrounding people including a worker to recognize an operation state of the robot.

Here, the display DPR (FIG. 3) provided on one side surface of the joint 31 has been described, but the display DPL provided on the opposite side surface can also be configured similarly to the display DPR. The wiring member 80 connecting the links may be laid only on the display DPR side, or the wiring member 80 may be divided into two pieces and laid on both the display DPR side and the display DPL side. Alternatively, the wiring connected to the driving unit of the joint 31 can be branched from the wiring member 80 and connected to the motor, the encoder, the torque sensor, etc. via the opening HL of the display DPL.

In a case where the outer shape of the side surface of the joint 31 is circular, it is preferable that the light sources 111 are arranged along the circumference around the rotation axis, and the diffusion plate 112 is also circular or donut-shaped. However, the arrangement of the light sources 111 and the shape of the diffusion plate 112 can be appropriately changed depending on the outer shape of the joint 31. In short, the shape of the display can be set to provide high visibility to people positioned around the robot arm 1.

Light Emission Pattern Control of Display

As described above, the operation status of the robot monitored by the operation state monitoring unit 98 and the result of the determination made by the abnormal state determination unit 99 are used not only for controlling the operation of the robot arm 1 but also for the display control unit 90 to control the display.

For example, a plurality of color LEDs are provided as the light sources 111, and a plurality of types of display patterns (or light emission patterns) can be configured in such a manner that the worker can easily identify an operation state or the like of the robot arm, by combining positions of LEDs to be turned on, colors of LEDs to be turned on, and whether to turn on LEDs in a continuous manner or in a blinking manner. A plurality of display patterns obtained by combining the colors of the LEDs and how to blink the LEDs can be assigned to an operation status of the robot arm 1, a work status, an abnormal state determination result, and the like.

For example, all blue light sources of the display can be turned on when the robot normally operates, all red light sources can be turned on when the robot abnormally stops, and all yellow light sources can be turned on when the robot is in teaching operation.

Alternatively, the display pattern may be set in association with the state of the robot or the content of work as follows.

- Power-on (servo motor-on) state: turn on all green light sources
- High-speed operation in which no work is performed in cooperation with a person (during automatic driving): display all blue light sources to be turned on
- Work involving an operation in cooperation with a person: operate a blue light source in a blinking manner
- Teaching operation work on robot arm (using command device 94): turn on all yellow light sources
- Teaching operation work on robot arm (during direct teaching performed by a person): turn on a yellow light source in a blinking manner
- Abnormal stop: turn on all red light sources
- Stop due to overload applied to joint: turn on a red light source in a blinking manner Note that the above-described display patterns (or light emission patterns) are merely exemplary, and the display pattern can be appropriately set according to the type of the robot or the content of the work so that the worker or the like can easily recognize the display pattern. That is, the display control unit 90 can control at least one of a light emission color of a light source, a light emission intensity of a light source, a temporal light emission pattern of a light source, a spatial light emission pattern of a light source, and the like in association with the state of the robot or the content of work. According to the present embodiment, it is possible to provide a robot capable of enabling surrounding people to visually recognize a light emission pattern for indicating the state of the robot or the content of work in an easy way.

Next, modifications of the embodiment according to the present invention will be described.

First Modification

Figure 9A:
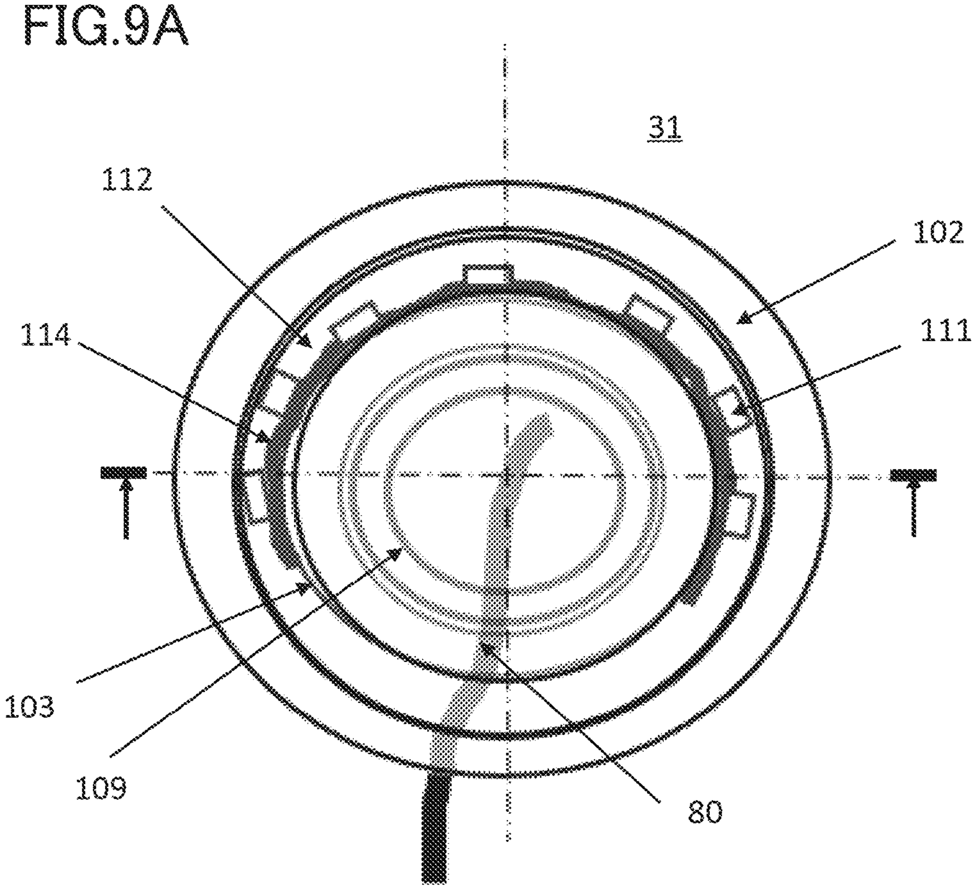
FIG. 9A is a cross-sectional view taken along a direction similar to line X1-X1 illustrated in FIG. 5 according to a first modification.
Figure 9B:
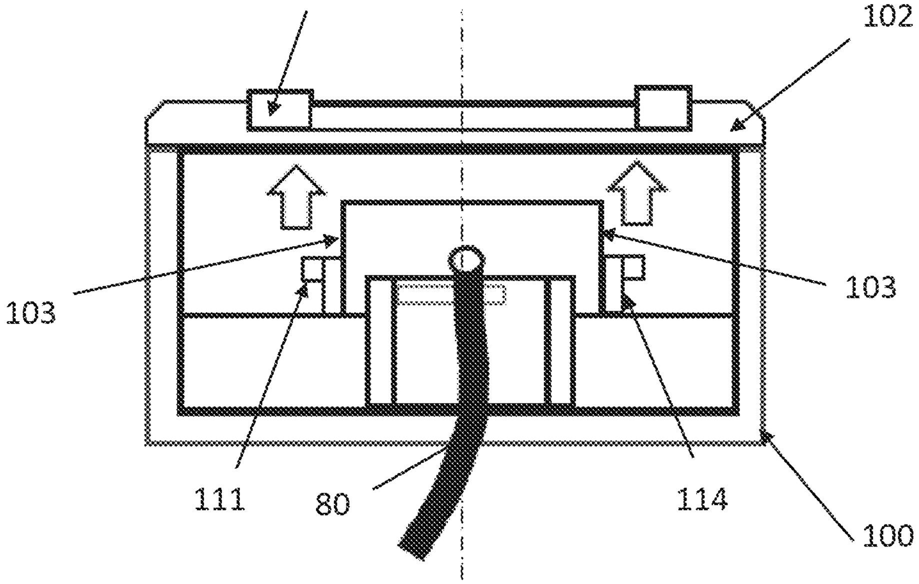
FIG. 9B is a cross-sectional view taken along a direction similar to line Y1-Y1 illustrated in FIG. 5 according to the first modification.

FIG. 9A is a cross-sectional view taken along a direction similar to line X1-X1 illustrated in FIG. 5 according to a first modification, and FIG. 9B is a cross-sectional view taken along a direction similar to line Y1-Y1 illustrated in FIG. 5 according to the first modification.

In the above-described embodiment, the light sources 111 are arranged in an annular shape along the circumference around the rotation axis. However, in the present modification, the light sources 111 are arranged in a C shape, not arranged on a partial portion of the circumference. Depending on the form of the joint, although light emitting units are provided, there may be a region that is invisible to surrounding people. By adopting a configuration in which no light emitting elements are arranged in such a region, the number of parts can be reduced and energy consumption can be reduced.

In the present modification, a flexible substrate is used as the substrate 114, and the flexible substrate is attached to follow an attachment surface 103 provided in the fixed frame 100. In the present modification as well, it is possible to provide a robot capable of enabling surrounding people to visually recognize a light emission pattern for indicating the state of the robot or the content of work in an easy way.

Second Modification

Figure 10A:
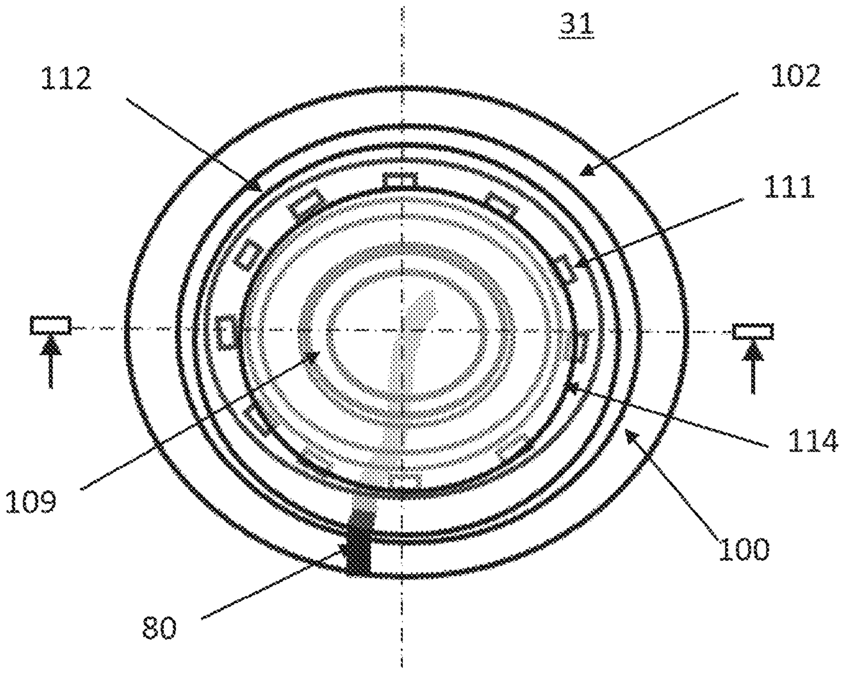
FIG. 10A is a cross-sectional view taken along a direction similar to line X1-X1 illustrated in FIG. 5 according to a second modification.
Figure 10B:
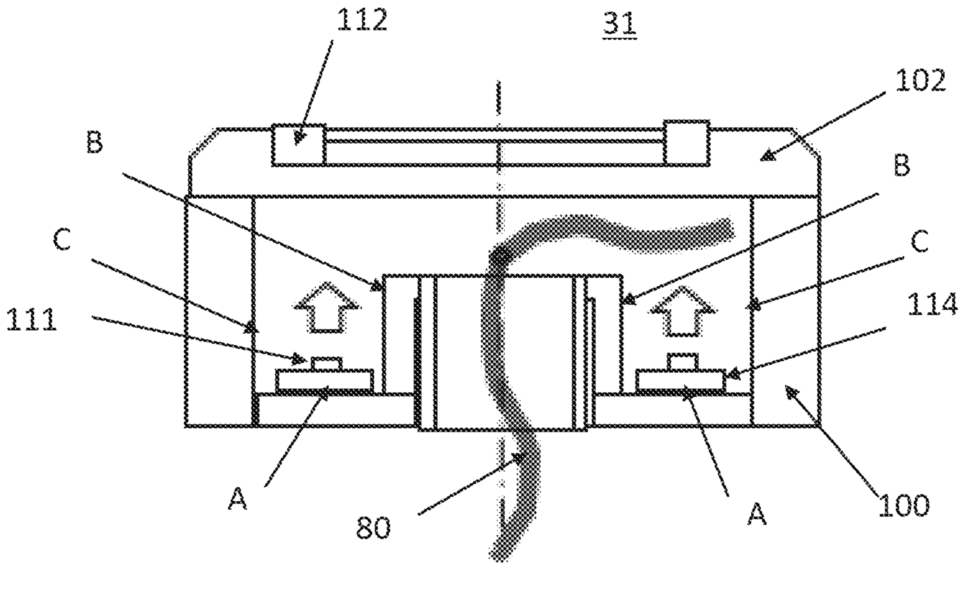
FIG. 10B is a cross-sectional view taken along a direction similar to line Y1-Y1 illustrated in FIG. 5 according to the second modification.

FIG. 10A is a cross-sectional view taken along a direction similar to line X1-X1 illustrated in FIG. 5 according to a second modification, and FIG. 10B is a cross-sectional view taken along a direction similar to line Y1-Y1 illustrated in FIG. 5 according to the second modification.

The substrate 114 is disposed on an attachment surface A in the fixed frame 100 in such a manner that light beams emitted from the light sources 111 travel toward the diffusion plate 112. A space surrounded by wall surfaces B and C substantially parallel to each other exists between the light sources 111 and the diffusion plate 112, and light beams travel through the space toward the diffusion plate 112.

At least partial portions of the attachment surface A of the substrate 114 in the fixed frame 100 and the wall surfaces B and C around the light sources 111 have a reflectance of 50% or more with respect to light (visible light) having a wavelength emitted from the light sources 111. That is, at least a partial portion of the wall surface defining the space S preferably has a reflectance of 50% or more with respect to light (visible light) emitted from the light sources 111. This is because the light beams emitted from the light sources 111 are guided to the diffusion plate 112 with high efficiency. The reflectance of 50% or more to the visible light emitted from the light sources can be imparted to the fixed frame 100 by an appropriate method such as mirror-polishing each surface using a metal material such as aluminum, using a white material, coating a reflective film made of metal or the like, or coating a white paint. In the present modification as well, it is possible to provide a robot capable of enabling surrounding people to visually recognize a light emission pattern for indicating the state of the robot or the content of work in an easy way.

Third Modification

Figure 11:
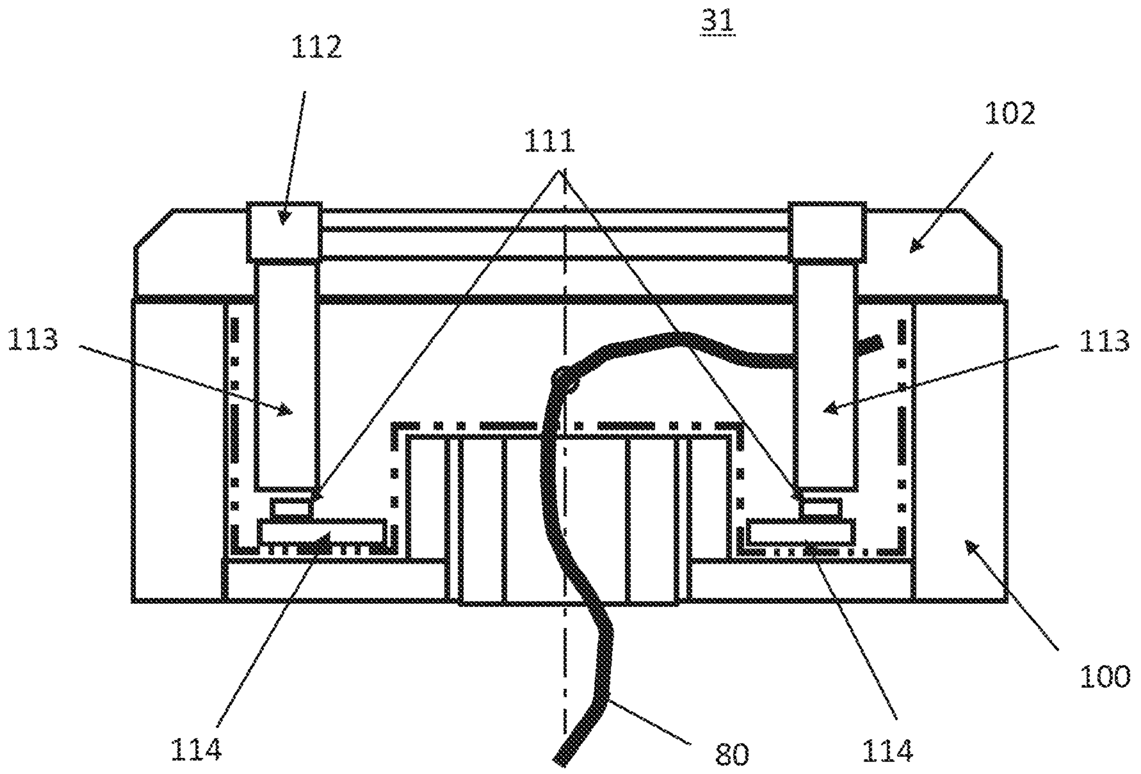
FIG. 11 is a cross-sectional view taken along a direction similar to line Y1-Y1 illustrated in FIG. 5 according to a third modification.

FIG. 11 is a cross-sectional view taken along a direction similar to line Y1-Y1 illustrated in FIG. 5 according to a third modification. The present modification includes a light guide member that connects the light sources 111 and the diffusion plate 112. A light pipe 113 serving as a light guide member is not necessarily in contact with both the light source 111 and the diffusion plate 112 to couple the light source 111 and the diffusion plate 112 to each other, and may be disposed only in a part of an optical path from the light sources 111 to the diffusion plate 112. Alternatively, the light pipe 113 may be a member integrated with the diffusion plate 112. As the light guide member, an optical fiber bundle or a light guide lens may be used instead of the light pipe 113. According to the present modification, light emitted from light sources 111 can be guided to the diffusion plate 112 with high efficiency. In the present modification as well, it is possible to provide a robot capable of enabling surrounding people to visually recognize a light emission pattern for indicating the state of the robot or the content of work in an easy way.

Fourth Modification

Figure 12A:
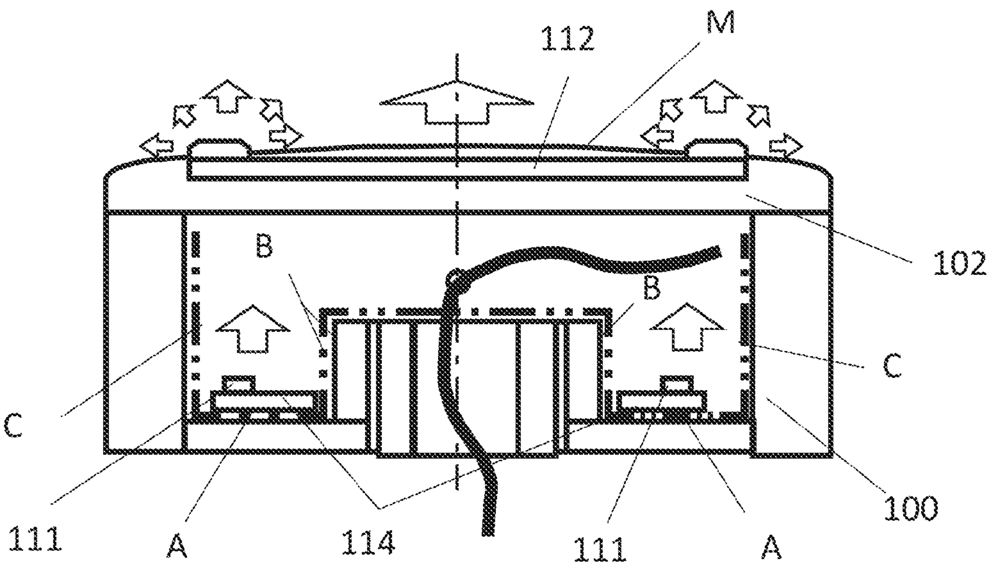
FIG. 12A is a cross-sectional view taken along a direction similar to line Y1-Y1 illustrated in FIG. 5 according to a fourth modification.
Figure 12B:
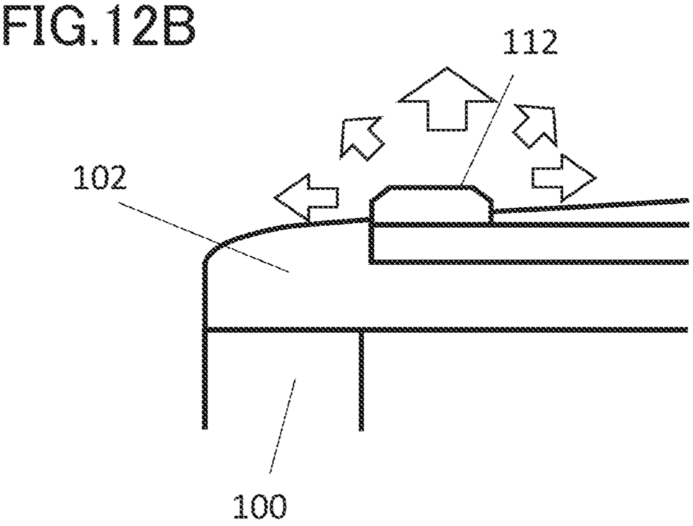
FIG. 12B is a partial enlarged cross-sectional view of the vicinity of a diffusion plate.

FIG. 12A is a cross-sectional view taken along a direction similar to line Y1-Y1 illustrated in FIG. 5 according to a fourth modification. In addition, FIG. 12B is a partial enlarged cross-sectional view of the vicinity of the diffusion plate 112.

In the present modification, in order to enhance the visibility from people in various directions or the visibility when the robot arm 1 takes various postures, a part of an emission surface of the diffusion plate 112 protrudes from an exterior surface M of the exterior cover 102. That is, as illustrated in FIG. 12B, a convex portion is formed in a part of the diffusion plate 112 to radiate light in various directions. One convex portion may be formed, or a plurality of convex portions may be formed. In the present modification as well, it is possible to provide a robot capable of enabling surrounding people to visually recognize a light emission pattern for indicating the state of the robot or the content of work in an easy way.

The robot according to the embodiment or the modification is not limited to the illustrated form including the six-axis vertical multi-joint arm, and may include various types of robots such as a vertical multi-joint type robot with a different number of axes, a parallel link type robot, and a linear motion joint type robot.

The display device is preferably provided on both side surfaces of a joint whose rotation axis intersects central axes of two links coupled thereto (a so-called bending joint), but may be provided only on one side surface of the joint. The display device is preferably provided in all the bending joints of the robot arm, but may be provided only in some of the bending joints. In addition, the display device may be provided in a joint other than the bending joint.

The operations to be executed by the robot device according to the embodiment or the modification are typically operations related to the manufacture of an article, representative examples of which include component assembly work, component conveyance work, component processing work (cutting, polishing, drilling, painting, bonding, welding, and the like), component cleaning work, and the like. However, other operations may be performed by the robot device.

The joint mechanism according to the embodiment or the modification can be applied to various machines and facilities such as an industrial robot, a service robot, and a processing machine operated by a numerical control of a computer. For example, the joint mechanism according to the embodiment can be applied to a joint of a machine or a facility capable of automatically performing an operation for expansion and contraction, bending and stretching, vertical movement, horizontal movement, turning, or a combination thereof based on information in the storage device provided in the control device. A drive device for driving the robot according to the embodiment, a control method and a control program for operating the robot according to the embodiment, and a computer-readable recording medium storing the control program are also included in the embodiments of the present invention.

Note that the present invention is not limited to the above-described embodiment and modifications, and many modifications can be made within the technical spirit of the present invention. For example, all or some of the embodiment and modifications described above may be combined for implementation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-159241, filed Sep. 22, 2023, which is hereby incorporated by reference herein in its entirety.

What is claimed is:

1. A robot comprising:

at least one joint connecting two links, wherein the joint includes a light source mounted on a substrate and a diffusion unit configured to diffuse light from the light source, and wherein a space in which a wiring is stored is provided between a virtual plane in the substrate and the diffusion unit.

2. The robot according to claim 1, wherein the substrate has an opening through which the wiring passes.

3. The robot according to claim 2, wherein a wiring guide is provided in the opening.

4. The robot according to claim 1, wherein the wiring is a wiring extending between the two links.

5. The robot according to claim 1, wherein the wiring is a wiring connected to a driving unit of the joint.

6. The robot according to claim 1, wherein the substrate is a solid substrate or a flexible substrate.

7. The robot according to claim 1, wherein the diffusion unit is disposed on a side surface of the joint.

8. The robot according to claim 7, wherein the diffusion unit is disposed on both side surfaces of the joint.

9. The robot according to claim 1, wherein the diffusion unit is a light transmissive diffusion plate.

10. The robot according to claim 1, wherein the diffusion unit has a portion protruding beyond a cover configured to cover a side surface of the joint.

11. The robot according to claim 1, wherein the light source includes a plurality of light emitting elements arranged around a rotation axis of the joint.

12. The robot according to claim 11, wherein the plurality of light emitting elements are arranged along a circumference about the rotation axis.

13. The robot according to claim 11, wherein the plurality of light emitting elements are arranged along a partial portion of a circumference about the rotation axis.

14. The robot according to claim 1, wherein at least a partial portion of a wall surface defining the space has a reflectance of 50% or more with respect to visible light emitted from the light source.

15. The robot according to claim 1, wherein a light guide member is disposed between the light source and the diffusion unit.

16. The robot according to claim 1, further comprising a display control unit configured to change a light emission pattern of the light source according to a state of the robot or a content of work performed by the robot.

17. The robot according to claim 16, wherein the display control unit controls at least one of a light emission color and a light emission intensity of the light source.

18. The robot according to claim 16, wherein the display control unit controls a temporal light emission pattern of the light source.

19. The robot according to claim 16, wherein the display control unit controls a spatial light emission pattern of the light source.

20. The robot according to claim 1, wherein the joint is a joint whose rotation axis intersects central axes of the two links to be connected.

21. The robot according to claim 1, wherein the robot is a six-axis control robot, and the light source and the diffusion unit are provided in at least one of a second joint configured to control a second axis, a third joint configured to control a third axis, and a fifth joint configured to control a fifth axis from a proximal end side.

22. The robot according to claim 1, wherein the space is provided between the virtual plane on which a main surface of the substrate is disposed and the diffusion unit.

23. A robot control method for controlling a robot comprising at least one joint connecting two links, the joint including a light source mounted on a substrate and a diffusion unit configured to diffuse light from the light source, and a space in which a wiring is stored is provided between a virtual plane in the substrate and the diffusion unit, the method comprising:

changing, by a control unit, a light emission pattern of the light source according to a state of the robot or a content of work performed by the robot.

* * * * *